Feb. 28, 1956     J. G. HOWARD     2,736,855
SPEED REGUALTOR FOR A MOTOR GENERATOR
Filed March 18, 1953     3 Sheets-Sheet 1
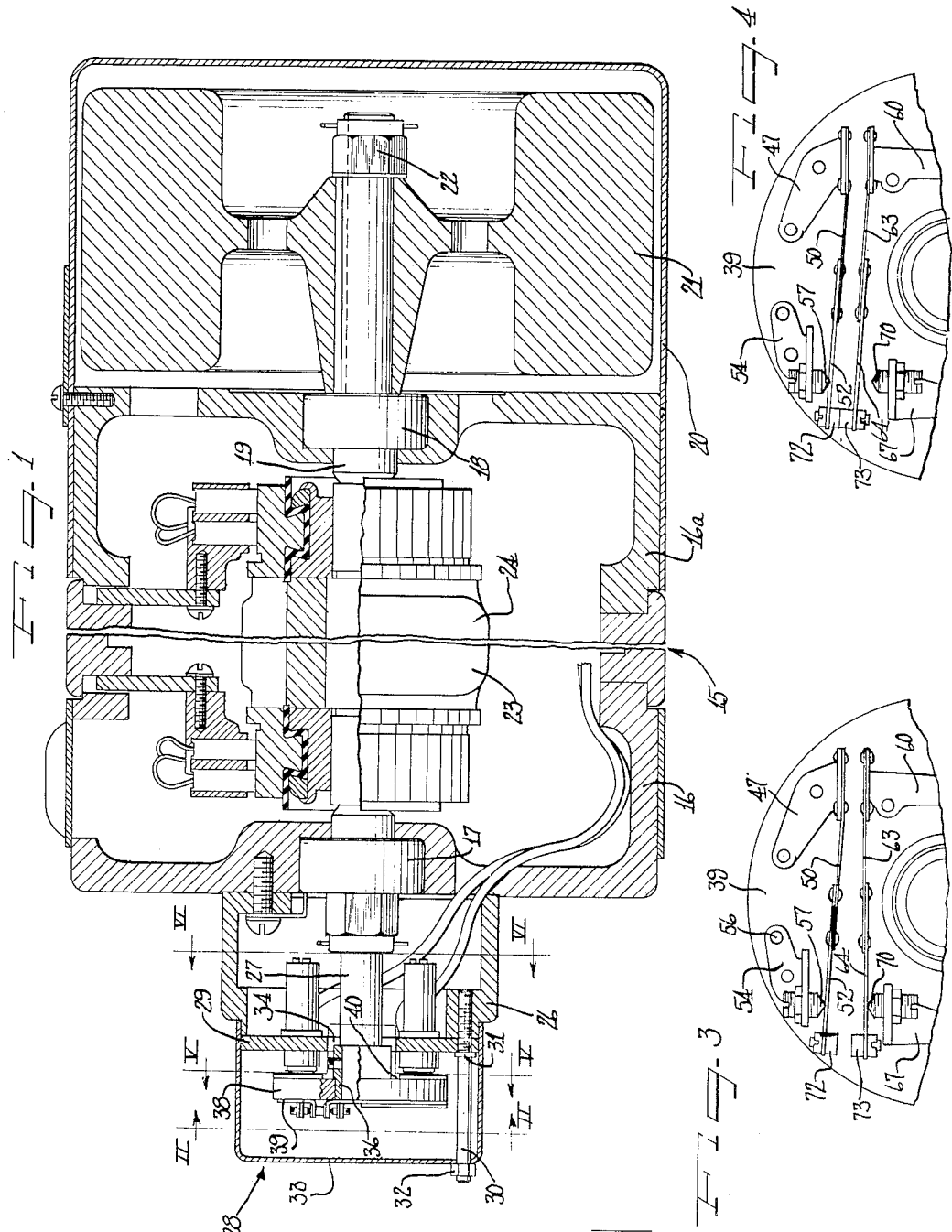
Inventor
John G. Howard
Hill, Sherman, Meroni, Gross & Simpson

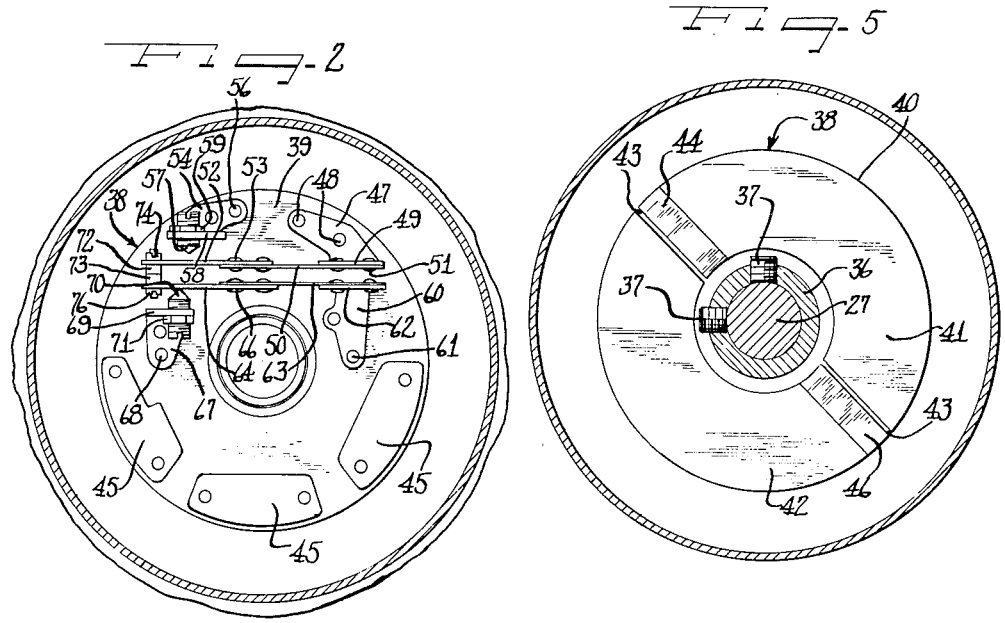

Feb. 28, 1956 J. G. HOWARD 2,736,855
SPEED REGUALTOR FOR A MOTOR GENERATOR
Filed March 18, 1953 3 Sheets-Sheet 3
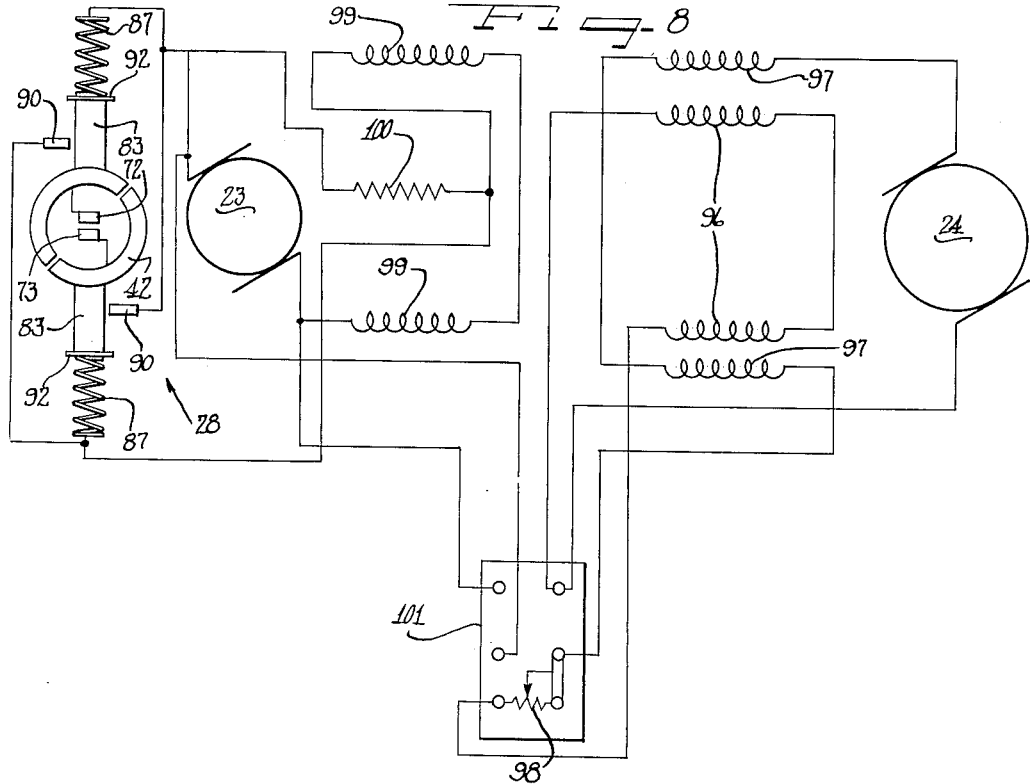
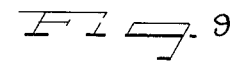
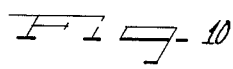
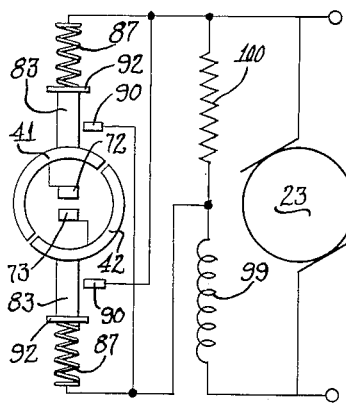
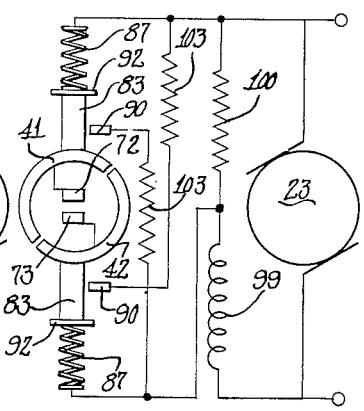
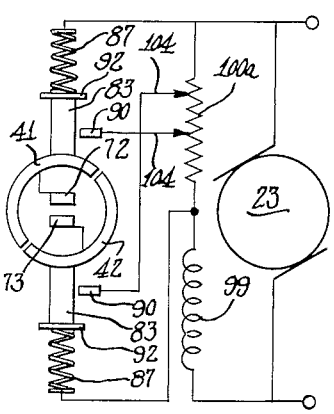
Inventor
John G. Howard
Hill, Sherman, Meroni, Gross & Simpson
Attys United States Patent Office 2,736,855
Patented Feb. 28, 1956

2,736,855
SPEED REGULATOR FOR A MOTOR GENERATOR

John G. Howard, Chicago, Ill., assignor to The Pyle-National Company, Chicago, Ill., a corporation of New Jersey Application March 18, 1953, Serial No. 343,066

13 Claims. (Cl. 318—325)

This invention relates generally to governing devices and more particularly to a torque and speed regulator for a motor-generator set of the type wherein a variable voltage input is delivered to a drive motor.

According to the general principles of this invention the field current of an electric motor is controlled by speed responsive switch means to provide maximum starting torque, a high operating speed, and a limit on the maximum speed of the motor.

The switch means comprises a pair of contact members supported on the armature of the motor, which are engaged when the motor is at rest and which are connected in series in the field circuit for minimum field resistance and thereby maximum field current and maximum starting torque. At a predetermined speed, one of the contact members moves outwardly in response to centrifugal action and out of engagement with the other contact member to partially open the field circuit, a resistance being connected across the contact members. This results in a reduced field current and, of course, an increased motor speed.

In accordance with an important feature of the invention, the other contact member is also moved outwardly in response to centrifugal action but not until the motor speed reaches a predetermined higher value. At this point, the other contact member re-engages the one contact member to short out the field resistance, increase field current, and reduce motor speed, thus providing a governor action limiting the maximum speed of the motor. The frequency with which the contact members open and close and the resistance value controlled thereby establishes an optimum operating speed for the motor.

To connect the contact members in the field circuit, commutator means are provided including commutator segments or slip rings electrically connected to and supported for rotation with contact members on the motor shaft, with brush means engaged with the commutator segments or slip rings and connected in the field circuit.

The present invention further contemplates the utilization of a safety device for the commutator apparatus which includes a brush holder having a guideway disposed on an axis intersecting the slip rings of the commutator means. The brush means are positioned in the guideway with one end thereof movable out of the brush holder for engagement with the commutator means. The other end of the brush means is loaded by a continuous biasing means such as a coil spring bottomed in the holder.

The brush means may preferably be of a conventional construction including a slug of carbon or the like material bonded to a base of copper or other conductive material. The brush means may wear down to the extent that they no longer engage the slip rings, thus opening the field circuit, in which case the speed of the motor might exceed a safe operating limit. Also, the copper base portions of the brush means might engage the commutator segments or slip rings to cause permanent damage thereto and mal-operation of the regulator. To prevent these possibilities from taking place circuit means including a pair of interengaging switch contact members are provided, one of the contact members being carried by the brush holder adjacent the guideway and the other of the contact members being carried by the brush means adjacent the innermost end thereof. Thus, the interengaging contact members will not only form a mechanical limit stop but will electrically engage one another near the outermost position of the brush means with respect to the brush holder.

The interengaging contact members may conveniently be in circuit with the field resistance of the motor so as to automatically decrease the effective value of the field resistance and hence the speed of the motor.

If desired, secondary resistance means can be associated with the switch contact members so that the secondary resistance means will be placed in parallel with the field resistance, thereby to reduce the effective value thereof.

A further embodiment of the present invention contemplates the utilization of an adjustable shunt circuit to selectively shunt out a selected effective quantity of the field resistance, which result is accomplished by providing an adjustable field resistance having a movable control tap and connecting the movable control tap in circuit with the switch contact members.

It is an object of the present invention to provide a motor speed regulator which will be operatively responsive to a plurality of different rotational speeds.

Another object of the present invention is to provide an improved commutator apparatus which includes a brush safety device to guard against failure to practice proper maintenance procedures.

Another object of the present invention is to provide commutator speed regulating means having an automatic cut-out.

A further object of the present invention is to provide an automatic cut-out which will shut off a motor generator in response to predetermined movement of the brushes.

Many other features, advantages and additional objects of the present invention will become manifest to those versed in the art upon making reference to the detailed description which follows and the accompanying sheets of drawings in which a preferred structural and electrical embodiment of a motor generator set incorporating the principles of the present invention is shown by way of illustrative example only.

On the drawings:

Figure 1 is a fragmentary cross-sectional view with parts shown in elevation and with parts broken away showing a motor-generator set provided in accordance with the principles of the present invention;

Figure 2 is an enlarged fragmentary cross-sectional view taken substantially on line II—II of Figure 1;

Figure 3 is a fragmentary view generally similar to the view of Figure 2 but showing switch contact members in one position of adjustment;

Figure 4 is a fragmentary view similar to Figure 3 but showing switch contact members in a different position of adjustment;

Figure 5 is a cross-sectional view taken substantially on line V—V of Figure 1;

Figure 6 is a cross-sectional view with parts removed and with parts shown in elevation taken substantially on line VI—VI of Figure 1;

Figure 7 is a side elevational view with parts shown in cross-section of the structure shown in Figure 6;

Figure 8 is a wiring diagram utilized in connection with the motor generator set shown in Figure 1;

Figures 9, 10 and 11 are wiring diagrams showing three alternative circuit means provided in connection with the brush limit switch arrangement according to the present invention.

As shown on the drawings:

A motor-generator set is indicated generally at 15 and comprises a housing indicated at 16 having a bearing 17 in one end thereof and a bearing 18 spaced away therefrom in a similar housing 16a so as to provide a journal support for a rotatable shaft indicated at 19. A casing shell 20 is connected to the housing 16a and houses a rotatable fly wheel 21 secured in co-rotatable assembly with the shaft 19 by fastening means indicated at 22.

The separate motor and the separate generator is inclosed between the bearings 17 and 18 and on the common shaft 19, the respective units being indicated at 23 and 24.

Attached to the end of the housing 16 is a supplementary housing 26 which encases a stub end 27 of the shaft 19.

The governor of the present invention is indicated generally at 28 and is located in the housing 26 for cooperation with the stub end 27 of the shaft 19 as will be hereinafter described.

The governor 28 more particularly comprises a disk shaped body member 29 made of a suitable dielectric apertured to receive a plurality of mounting posts indicated at 30 utilized to connect the body member 29 in firm assembly with the housing 26. As shown in the drawings, each of the posts 30 is threaded on one end thereof to mate with a correspondingly threaded recess provided in the housing 26. A shouldered washer 31 carried by the post 30 engages the body member 29 and a nut 32 threads on the opposite end of each of the posts 30 and abuttingly engages the outside surface of a cup-shaped shell 33 retained on the end of the housing 26 to close the open end thereof.

The stub end 27 of the shaft 19 extends through an aperture 34 provided in the body member 29 and is received in the bore of a hub member 36. As shown in Figure 5, the hub member 36 is locked for co-rotation with the stub end 27 by a plurality of set screws 37 which are threaded through the hub 36 into engagement with the stub end 27.

A disk shaped body member extends radially outwardly of the hub member 36 and is indicated generally by the reference numeral 38.

The body member 38 is preferably made of a suitable dielectric material and provides a pair of generally radially extending parallel flat faces which are spaced apart from one another and which are indicated by the reference numerals 39 and 40, respectively.

As shown in Figures 2 and 5, the face 40 is characterized by the provision of commutator means including a pair of commutator segments or slip rings 41 and 42 separated by a gap indicated at 43. A pair of tungsten inserts indicated at 44 and 46 respectively are provided at the trailing edges portion of the segments 41 and 42. The opposite face 39 has attached thereto various balancing weights indicated at 45, but is particularly characterized by the attachment thereto of relatively movable centrifugally responsive switch contact members positioned in response to rotational speed variations and each movable component exhibiting either appreciable different moments of inertia or being otherwise constructed to respond to different speeds.

More specifically, there is provided a switch which includes a bracket 47 made of electrically conductive material and connected to the body member 38 by means of rivets 48 arranged not only to mechanically join the bracket 47 in firm assembly with the body member 38 but to electrically connect the bracket member 47 with one of the slip rings 41 and 42.

An out turned flange 49 is provided on the bracket member 47 and extends normal to the face 39 for attachment to a flat leaf spring indicated at 50. The spring 50 is connected to the flange 49 by means of a plurality of rivets indicated at 51 and has a movable free end connected to a switch contact member 52 by means of rivets indicated at 53.

A stop bracket member 54 is connected to the body member 38 by means of rivets 56. A stop member 57 is carried by a flange 58 turned outwardly from the bracket member 54 normal to the surface 39. The stop member 57 is threaded and may be adjustably positioned and secured in adjusted position by a lock nut 59.

It will be appreciated that the brackets 47 and 54 are spaced radially outwardly of the axis of rotation of the body member 38 and the leaf spring 50 extends in chordal relationship relative to the face 39 with the contact member 52 normally lying in spaced relationship to the stop member 57. By selecting the leaf spring 50 to provide a spring biasing force of predetermined quantitative value, the switch contact 52 will not engage the stop member 57 until a predetermined rotational speed condition has been attained.

Although the principles of the present invention are of general utility, the speed governor 28 herein disclosed finds a particularly useful application when applied in connection with a motor receiving a variable voltage input. For example, in a motor-generator installation for a railway train, the available power voltage may vary considerably between that of a battery power source and the interconnected generator power. The available voltage will also vary because of starting and stopping movements of the tractive power unit.

By making a suitable contact member of the stop member 57, the switch 57—52 could be conveniently placed in control of the field resistance circuit of a direct current motor, the contact members being normally open but closing as soon as the motor rotates the stub end 27 of the shaft 19 at a predetermined rotational speed.

In accordance with a preferred embodiment of the present invention, however, a second relatively movable switch contact member is provided, and in this connection a second contact bracket member 60 is connected by means of rivet 61 to the body member 38 in spaced relation to the bracket 47. The bracket 60 provides a flange 62 carrying a leaf spring 63 which is preferably a stronger spring than the leaf spring 50, the leaf spring 63 extending generally parallel to the leaf spring 50 and having a contact member 64 connected on the free end thereof by a plurality of rivets 66.

A second stop bracket 67 is connected to the body member 38 by a plurality of fasteners 68 and provides a flange 69 threadedly receiving a stop member 70 which can be locked in adjusted position by a jam nut 71. The stop member 70 is normally engaged by the contact member 64 at rest.

At the extreme ends of the contact members 52 and 64, a pair of contact members are provided indicated by the reference numerals 72 and 73 each being connected by a fastener 74 and 76 to the contact member 52 and the contact member 64 respectively. The contact members 72 and 73 engage one another when the body member 38 is in the rest position of Figure 2.

Since the leaf springs 50 and 63 are purposely selected to provide a different spring biasing force, it will be evident that each of the movable spring members 50 and 63 exhibit the same properties as if they possessed appreciably different moments of inertia insofar as their centrifugal response characteristics are concerned and, accordingly, the contact member 52 and the contact member 64 will be moved radially outwardly at different rotational speeds of the body member 38.

By placing the switch contact members in control of electric circuit means associated with the field resistance of a D. C. motor, the switch contact members will be normally closed at rest (contact members 52, 72, 73, 64 being in engagement) so that the maximum field resistance will be shunted out.

At a predetermined rotational speed of the shaft 19, for example, at some fractional value of the rated speed of the motor, the contact member 52 controlled by the weaker spring 50 will move radially outwardly into stop engagement with the stop member 57 the contact members 72 and 73 being separated whereupon the field resistance will be increased. In view of the characteristics of a D. C. motor, the increase in resistance will reduce the field strength and the speed of the motor will increase. The position described is shown in Figure 3 wherein the contact member 52 is engaged with the stop member 57, however, the contact member 64 remains in stop engagement with the stop member 70.

Upon a sensible increase in speed, the contact member 64 will be moved radially outwardly so that the field resistance will be shunted out upon reengagement of contact members 72 and 73. By virtue of such provision, the maximum speed of the motor will be effectively regulated. This latter is illustrated in Figure 4 wherein both contact members 52 and 64 are moved radially outwardly and the contact members 72 and 73 are reengaged. The frequency with which the contact members 72 and 73 open and close and the resistance value controlled thereby establishes an optimum operating speed for the motor.

The governor brush assembly is retained on the body member 29 and the details of construction are shown in Figures 6 and 7 wherein a pair of brush holder housings are indicated at 80, the portion extending from one face of the body member being provided with an insulator cap 81. Each of the brush holder housings 80 provide a guide way or track way 82 slidably positioning a slug reciprocable along an axis intersecting the commutator means or slip rings 41 and 42. Each of the slugs is indicated at 83 and includes a carbon end 84 projecting out of each respective housing 80 towards the body member 38 for engagement with the slip rings 41 and 42. At the opposite end of each of the slugs 83 is an electrically conductive portion connected to a brush pig tail. More specifically, a pilot portion 86 is provided which seats one end of a coil spring 87, the other end of the coil 87 having a spring retainer 88 carried thereby.

The brush pig tail or conducting means 85 provided between the retainer 88 and the slugs 83 and a retainer cap 89 is threaded into the end of insulator cap 81 so as to engage the retainer 88 within the housing 80. It will be evident, therefore, that the slugs 83 are continuously biased into engagement with the slip rings 41 and 42. Since the slugs 83 are subject to wear produced by the sliding contact between the slip rings 41 and 42 and the slugs 83, proper maintenance procedures require periodic replacement of the slugs 83.

In accordance with the principles of the present invention, a safety device is provided for the governor 28 to guard against failure to practice proper maintenance procedures and such safety device comprises circuit means including a pair of interengaging switch contact members engageable with one another in response to alignment of the slugs 83 at a position near the outermost position of the brush means with respect to the brush holder or housing 80.

More particularly, there is provided a switch contact member 90 which is carried on the body member 29 by means of rivets 91, the contact member 90 including a projecting portion extending adjacent the guide way or track way 82 and adapted to be engaged by the end of the spring indicated at 92 which engages the innermost end of the slug 83. It will be appreciated, therefore, that the switch contact member 90 and the end 92 of the spring 87 cooperate with one another to form a mechanical limit stop as well as interengaging switch contact members engageable with one another when the slug 83 is positioned near the outermost adjustment with respect to the brush holder 80.

Supplementary circuit means may be controlled by the auxiliary switch afforded through the provision of switch contact members 90 and 92 and in connection with the various circuit arrangements which are advantageously used in connection with the present invention, reference should be made to the wiring diagrams of Figures 8 through 11.

In Figure 8, the generator 24 is indicated as being of the compound type including a shunt field 96 and a series field 97, suitable connections being made to a generator field resistor indicated at 98.

The motor 23 is shown as a D. C. motor having a shunt field 99 and a field resistor 100.

The motor 23 and the generator 24 are suitably terminalized electrically by means of a terminal block indicated generally at 101.

As is clearly illustrated in Figure 8, the interengaging contact members 90, 92 may conveniently be in circuit with the field resistance of the motor 23 so as to automatically decrease the effective value of the field resistance and hence the speed of the motor.

The various components of the controller governor 28 bear similar reference numerals in the wiring diagrams of Figures 8 through 11 as in the previously described drawings.

In Figures 9, 10 and 11, three different supplementary circuits are shown which are controlled by the brush safety device including the interengaging switch contact members 90 and 92.

In Figure 9, engagement of the switch contact members 90 and 92 will shunt out the field resistance 100. Accordingly, the motor 23 will be provided with a strong field and the speed of the motor will be decreased.

In Figure 10, a supplementary resistance 103 provided in the circuit means including the switch contact member 90 is placed in parallel with the field resistance 100 upon interengagement of the switch contact members 90 and 92, thereby, in effect, reducing the effective value of the field resistance 100 so as to increase the strength of the motor field with a resultant decrease in the speed of the motor.

In the arrangement of Figure 11, the field resistance is indicated at 100a and takes the form of a continuously adjustable resistance member having movable tap means indicated at 104.

Each of the switch contact members 90 is connected in circuit with the movable tap means 104 and suitable adjustment may be effected so that interengagement of the switch contact members 90 and 92 will selectively proportionably reduce the effective value of the field resistance 100a, thereby increasing the strength of the field of the motor 23 and reducing the speed of the motor 23.

Although various modifications might be suggested by those versed in the art in connection with the mechanical and electric details described herein by way of illustrative example only for the sake of clarity, it should be understood that I wish to embody within the patent warranted hereon all such modifications as reasonably and properly come within the scope of my contribution to the art.

I claim as my invention:

1. A safety device for a direct current electric motor having a field resistance comprising a brush holder having a guideway disposed on an axis intersecting a motor commutator means, brush means in said guideway having one end movable out of said brush holder for engagement with the commutator means and having the other end loaded by a continuous biasing means bottomed in said holder, and circuit means including a pair of interengaging switch contact members, one of said contact members being carried by said holder adjacent to said guideway and the other of said contact members being carried adjacent said other end of said brush means, thereby to engage near the outermost position of said brush means with respect to said holder, said circuit means being controlled by said contact members and being in circuit with said field resistance to automatically decrease the effective value of said field resistance and the speed of said motor in response to movement of said brush means toward said commutator means beyond a predetermined limit position.

2. A speed regulator circuit means as defined in claim 1 wherein said last mentioned circuit means comprises a shunting circuit to shunt out said field resistance.

3. A speed regulator circuit means as defined in claim 1 wherein said last mentioned circuit means comprises secondary resistance means and circuit means placing said secondary resistance means in parallel with said field resistance, thereby to reduce the effective value of said field resistance.

4. A speed regulator circuit means as defined in claim 1 wherein said last mentioned circuit means comprises an adjustable shunt circuit to selectively shunt out a selected effective quantity of said field resistance.

5. A speed regulator circuit means as defined in claim 1 wherein said field resistance comprises an adjustable resistance having a movable control tap, said last mentioned circuit means comprising a shunt circuit connected between said movable control tap and said limit contact member to selectively short out said field resistance.

6. Speed regulating means for a motor generator comprising a motor having a motor field and a field resistance, said motor further including a governor connected thereto for co-rotation therewith, said governor comprising a disk shaped body having an axis of rotation coincident with the axis of rotation of said motor and providing a radially extending flat face, a contact bracket on said face spaced radially outwardly of said axis, a leaf spring connected at one end to and extending from said bracket in chordal relation to said face, the free end of said leaf spring being movable radially outwardly, a stop bracket on said face, and stop means on said stop bracket to engage the free end of said leaf spring upon radial outward movement of said free end in response to rotation of said body, a second contact bracket on said face having a leaf spring connected thereto and extending generally parallel to said first mentioned leaf spring but being stronger than said first leaf spring, a second stop bracket having a stop means normally engaging said second leaf spring, said leaf springs having contact means on the end thereof providing a normally closed switch, and circuit means connected to said contact brackets and said field resistance, outward movement of said first mentioned leaf spring opening said switch at one predetermined speed for increasing resistance in the motor circuit and outward movement of said second mentioned leaf spring reclosing said switch in response to a further increase in speed reducing resistance in the motor circuit, the frequency of said opening and closing being determinative of an optimum motor speed.

7. Speed regulating means for a motor generator comprising a motor having a motor field and a field resistance, said motor further including a governor connected thereto for co-rotation therewith, said governor comprising a disk shaped body having an axis of rotation coincident with the axis of rotation of the motor armature and providing a pair of spaced apart parallel extending flat faces, a contact bracket on one of said faces spaced radially outwardly of said axis, a leaf spring connected at one end to and extending from said bracket in chordal relation to said one face, a stop bracket on said face, and stop means on said stop bracket said spring comprising part of a normally open switch to control said field resistance, said switch closing in response to speed of rotation of said body, the other of said faces having a pair of segments thereon, a pair of brush holders adjacent said other face, each brush holder comprising a housing providing a track way and having a brush reciprocally positioned in said track way and spring biased outwardly of said housing towards engaging relationship with said segments, a brush limit contact member adjacent said track way and a limit stop on said brush to engage said limit contact member near the outermost position of said brush, and circuit means connected to said stop and said contact member and to said field resistance to automatically decrease the effective value of said field resistance and the speed of the motor in response to extreme movement of either of said brushes toward said segments.

8. Speed regulating means for a motor generator comprising a motor having a motor field and a field resistance, said motor further including a governor connected thereto for co-rotation therewith, said governor comprising a disk shaped body having an axis of rotation coincident with the axis of rotation of the motor armature and providing a pair of spaced apart parallel extending flat faces, a contact bracket on one of said faces spaced radially outwardly of said axis, a leaf spring connected at one end to and extending from said bracket in chordal relation to said one face, a stop bracket on said face, and stop means on said second bracket the other of said faces having a pair of segments thereon, a pair of brush holders adjacent said other face, each brush holder comprising a housing providing a track way and having a brush reciprocally positioned in said track way and spring biased outwardly of said housing towards engaging relationship with said segments, a brush limit contact member adjacent said track way and a limit stop on said brush to engage said limit contact member near the outermost position of said brush, and circuit means connected to said stop and said contact member and to said field resistance to automatically decrease the effective value of said field resistance and the speed of the motor in response to extreme movement of either of said brushes toward said segments, a second contact bracket on said face having a leaf spring connected thereto and extending generally parallel to said first mentioned leaf spring but being stronger than said first leaf spring, a second stop bracket having a stop means normally engaging said second leaf spring, said springs having interengaging contact members and having circuit means connected thereto and to said field resistance, outward movement of said first mentioned leaf spring at one predetermined speed separating said contact members and increasing resistance in the motor circuit and outward movement of said second leaf spring in response to a further increase in speed reengaging said contact members and decreasing resistance in the motor circuit.

9. A safety device for a direct current electric motor having a field resistance comprising a brush holder having a guide way disposed on an axis intersecting a motor commutator means, brush means in said guide way having one end movable out of said brush holder for engagement with the commutator means and having the other end loaded by a continuous biasing means bottomed in said holder, and circuit means including a pair of interengaging switch contact members, one of said contact members being carried by said holder adjacent to said guide way and the other of said contact members being carried adjacent said other end of said brush means, thereby to engage near the outermost position of said brush means with respect to said holder, said contact members being in circuit with said field resistance to automatically decrease the effective value of said field resistance and the speed of the motor.

10. A safety device for a direct current electric motor having a field resistance comprising a brush holder having a guide way disposed on an axis intersecting a motor commutator means, brush means in said guide way having one end movable out of said brush holder for engagement with the commutator means and having the other end loaded by a continuous biasing means bottomed in said holder, and circuit means including a pair of interengaging switch contact members, one of said contact members being carried by said holder adjacent to said guide way and the other of said contact members being carried adjacent said other end of said brush means, thereby to engage near the outermost position of said brush means with respect to said holder, said contact means being in control of a shunt circuit to selectively shunt out the field resistance of the motor.

11. A safety device for a direct current electric motor having a field resistance comprising a brush holder having a guide way disposed on an axis intersecting a motor commutator means, brush means in said guide way having one end movable out of said brush holder for engagement with the commutator means and having the other end loaded by a continuous biasing means bottomed in said holder, and circuit means including a pair of interengaging switch contact members, one of said contact members being carried by said holder adjacent to said guide way and the other of said contact members being carried adjacent said other end of said brush means, thereby to engage near the outermost position of said brush means with respect to said holder, said contact members being in circuit with secondary resistance means and being connected with circuit means placing said secondary resistance means parallel with the field resistance of said motor, thereby to reduce the effective value of said resistance.

12. A safety device for a direct current electric motor having a field resistance comprising a brush holder having a guide way disposed on an axis intersecting a motor commutator means, brush means in said guide way having one end movable out of said brush holder for engagement with the commutator means and having the other end loaded by a continuous biasing means bottomed in said holder, the circuit means including a pair of interengaging switch contact members, one of said contact members being carried by said holder adjacent to said guide way and the other of said contact members being carried adjacent said other end of said brush means, thereby to engage near the outermost position of said brush means with respect to said holder, said field resistance of said motor comprising an adjustable resistance having a movable control tap, and circuit means comprising a shunt circuit connected between said movable control tap and said contact members to selectively shunt out said field resistance.

13. A motor speed regulator for a motor having an armature, a motor field, and a field resistance, said regulator comprising rotatable commutator means including two normally closed relatively movable centrifugally responsive switch contact members positioned in response to rotational speed variations and each movable component exhibiting appreciable different moments of inertia to response at different speeds, said contact members supported on the armature of the motor and being engaged with one another when the motor is at rest and being connected in series in electric circuit with the motor field for minimum field resistance and thereby maximum field current and maximum starting torque, one of said contact members being movable outwardly in response to centrifugal action at a predetermined speed to partially open the circuit of the motor field with the resistance being connected across the contact members, thereby reducing field current and increasing motor speed, the other contact member moving outwardly in response to centrifugal action at a higher predetermined speed to re-engage said one contact member and to short out field resistance, increase field current and reduce motor speed, the frequency with which said contact members open and close and the resistance controlled thereby being determinative of motor optimum operating speed.

References Cited in the file of this patent

UNITED STATES PATENTS

| | | |
|---|---|---|
| 1,100,748 | Laycock | June 23, 1914 |
| 1,334,868 | Laycock | Mar. 23, 1920 |
| 1,767,146 | Lee | June 24, 1930 |
| 2,135,303 | Greene | Nov. 1, 1938 |
| 2,143,920 | Lee et al. | Jan. 17, 1939 |
| 2,175,837 | Hanna | Oct. 10, 1939 |
| 2,194,620 | Sekyra | Mar. 26, 1940 |